J. GRZYBOWSKI.
CORN OR BEAN PLANTER.
APPLICATION FILED OCT. 28, 1919.
1,362,569.
Patented Dec. 14, 1920.
7 SHEETS—SHEET 5.
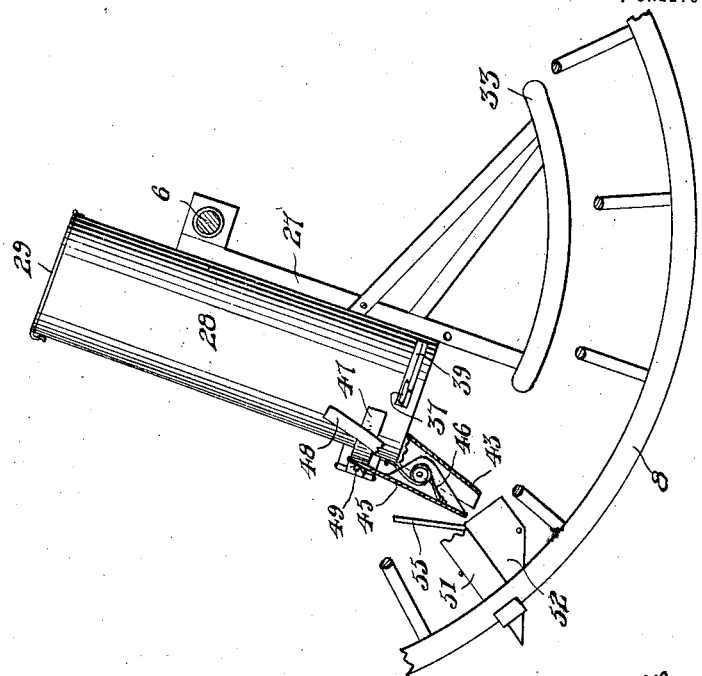
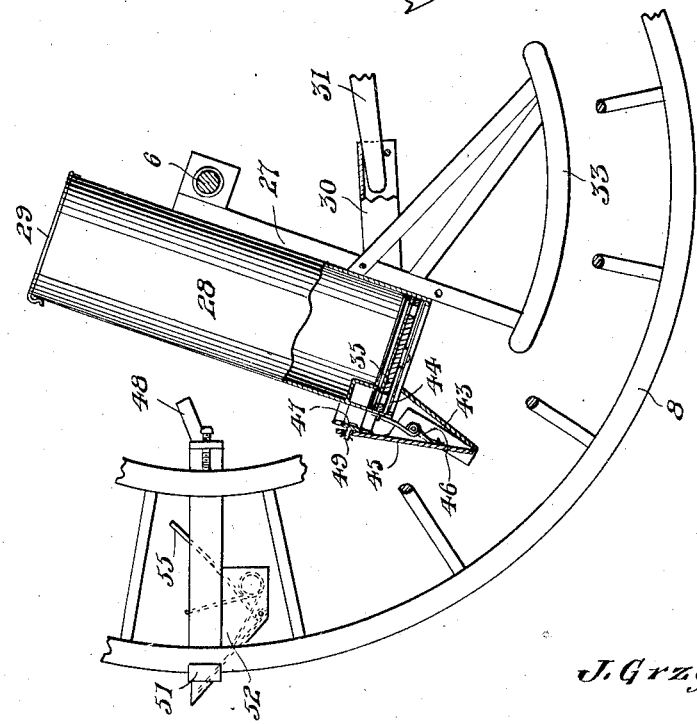
Inventor
J. Grzybowski
By N. M. Wilson
Attorney J. GRZYBOWSKI.
CORN OR BEAN PLANTER.
APPLICATION FILED OCT. 28, 1919.
1,362,569.
Patented Dec. 14, 1920.
7 SHEETS—SHEET 6.
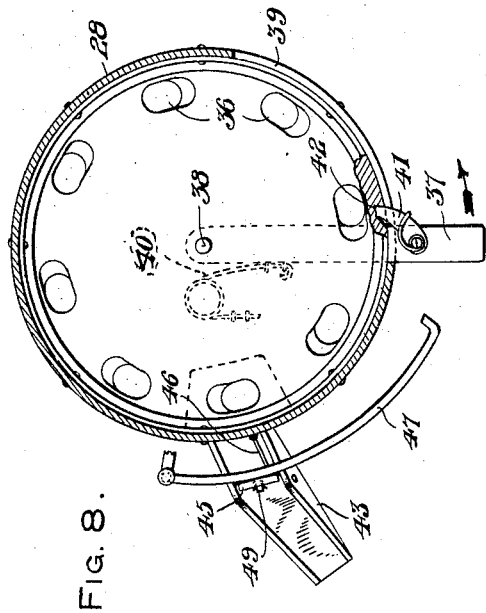
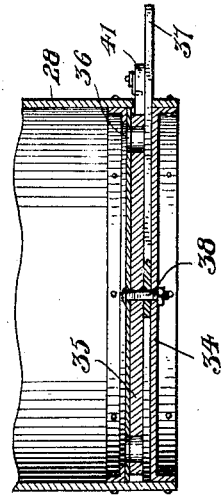
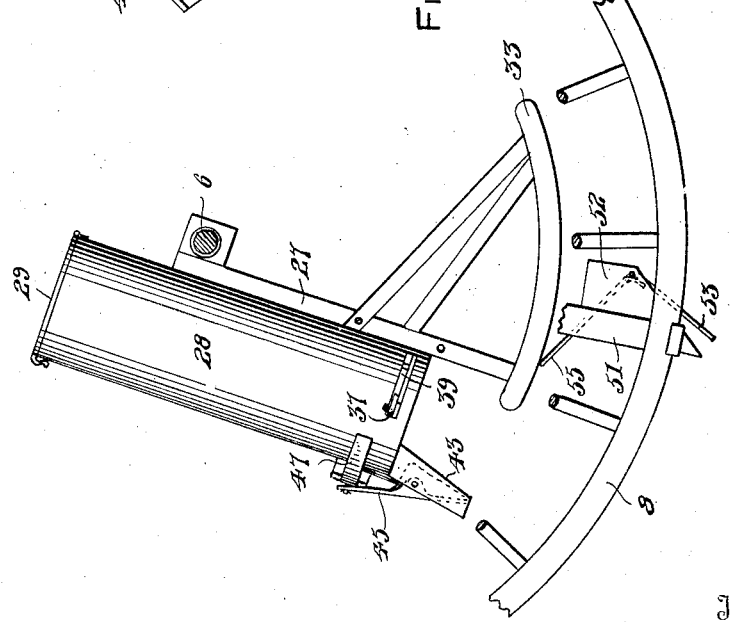
Inventor
J. Grzybowski
By
Attorney J. GRZYBOWSKI.
CORN OR BEAN PLANTER.
APPLICATION FILED OCT. 28, 1919.
1,362,569.
Patented Dec. 14, 1920.
7 SHEETS—SHEET 7.
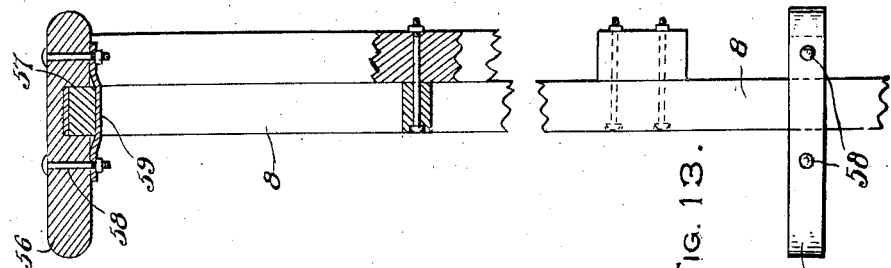
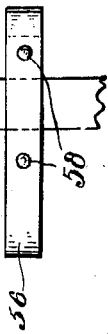
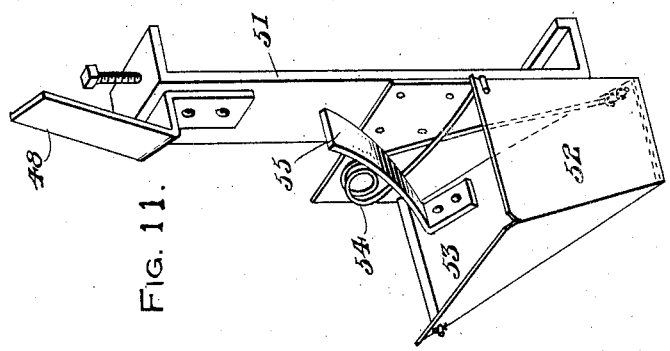
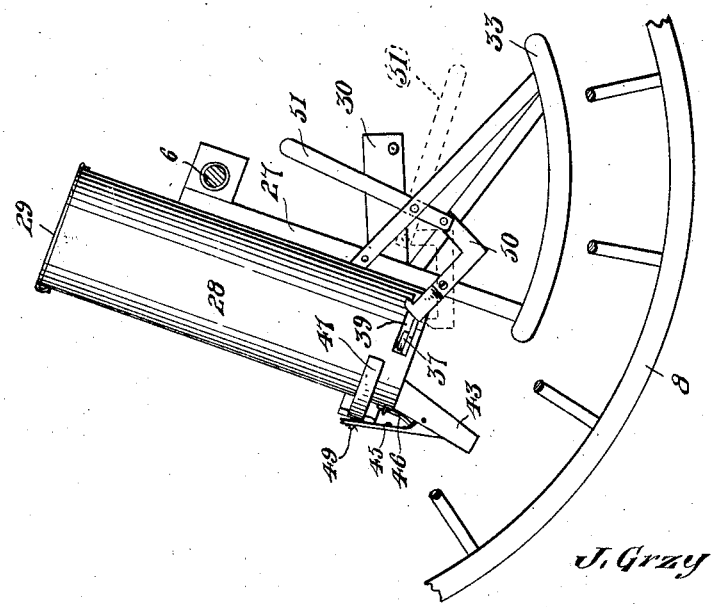
Inventor
J. Grzybowski
By
Attorney

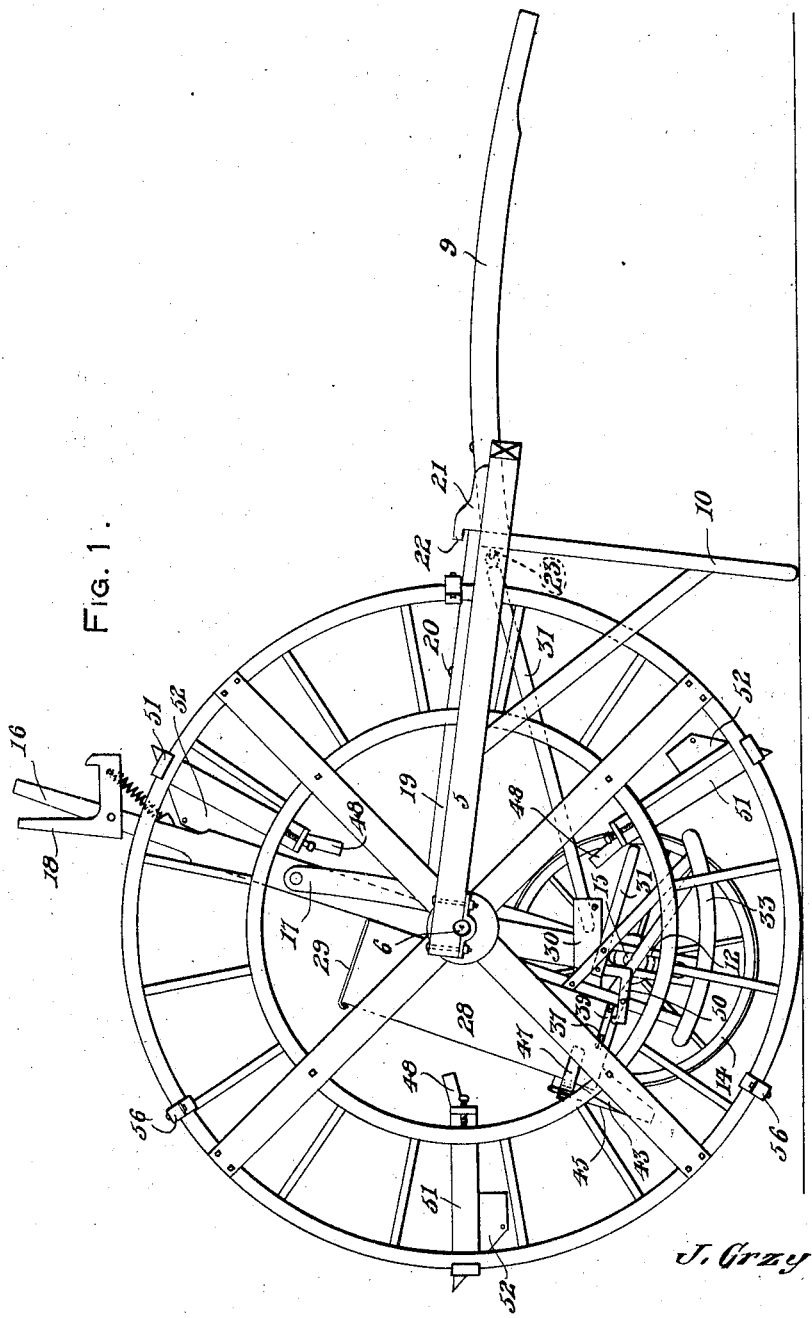

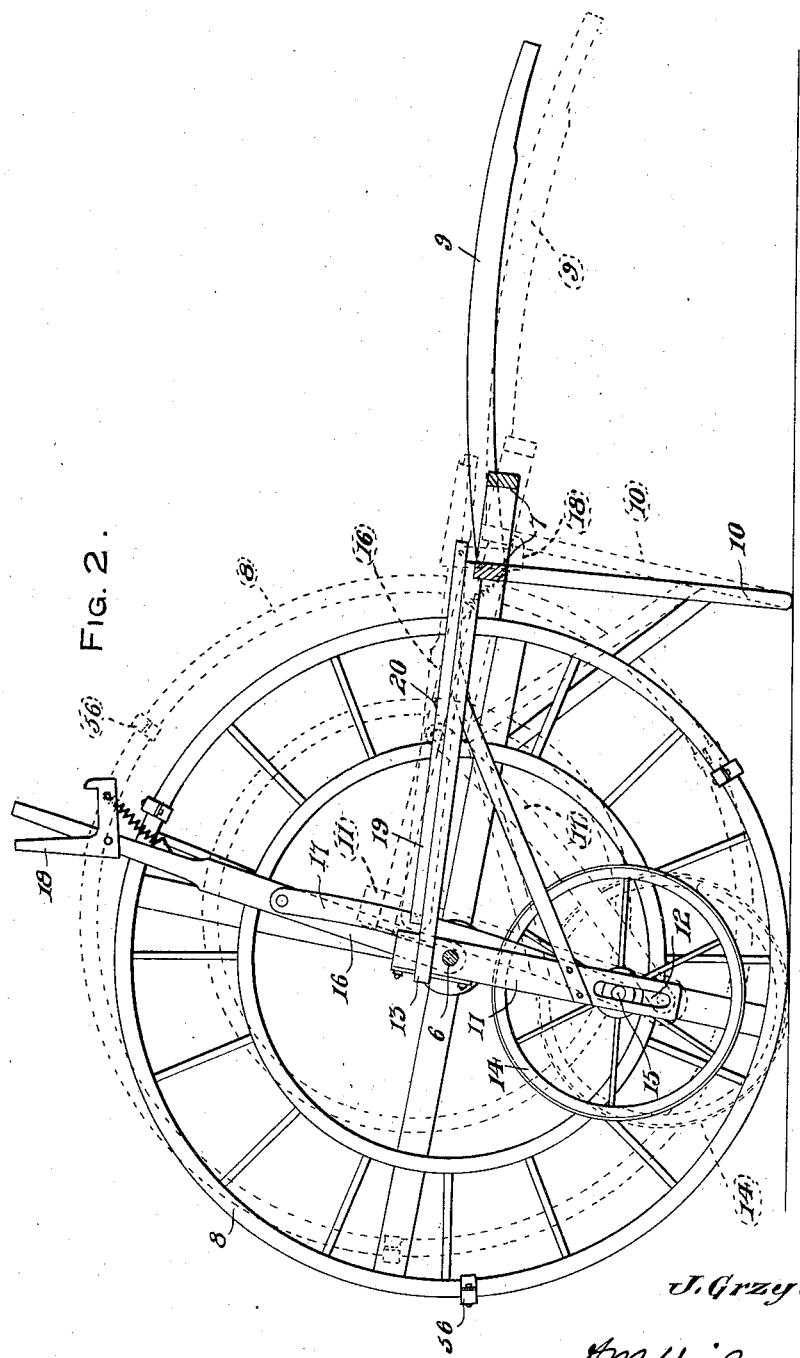

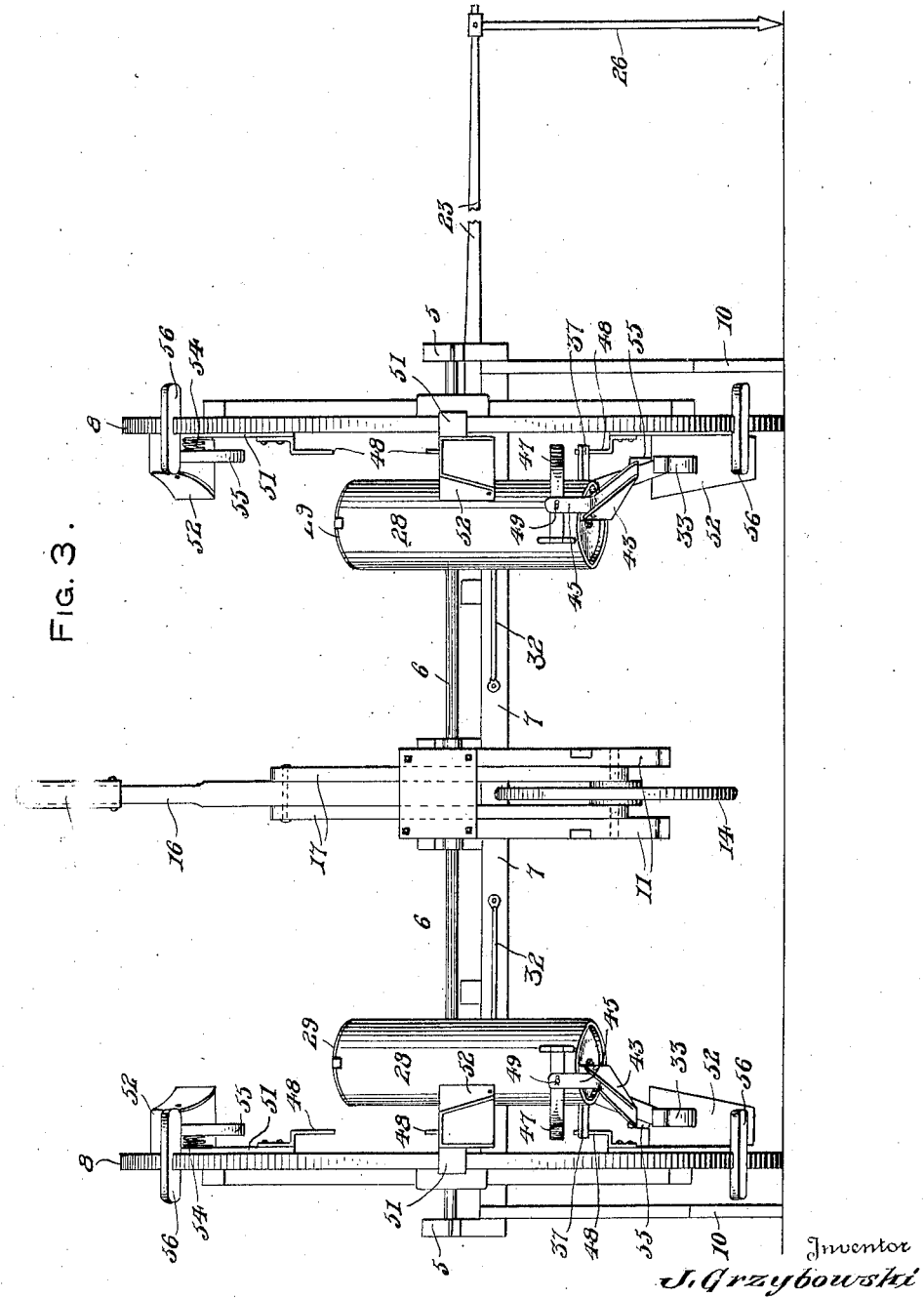

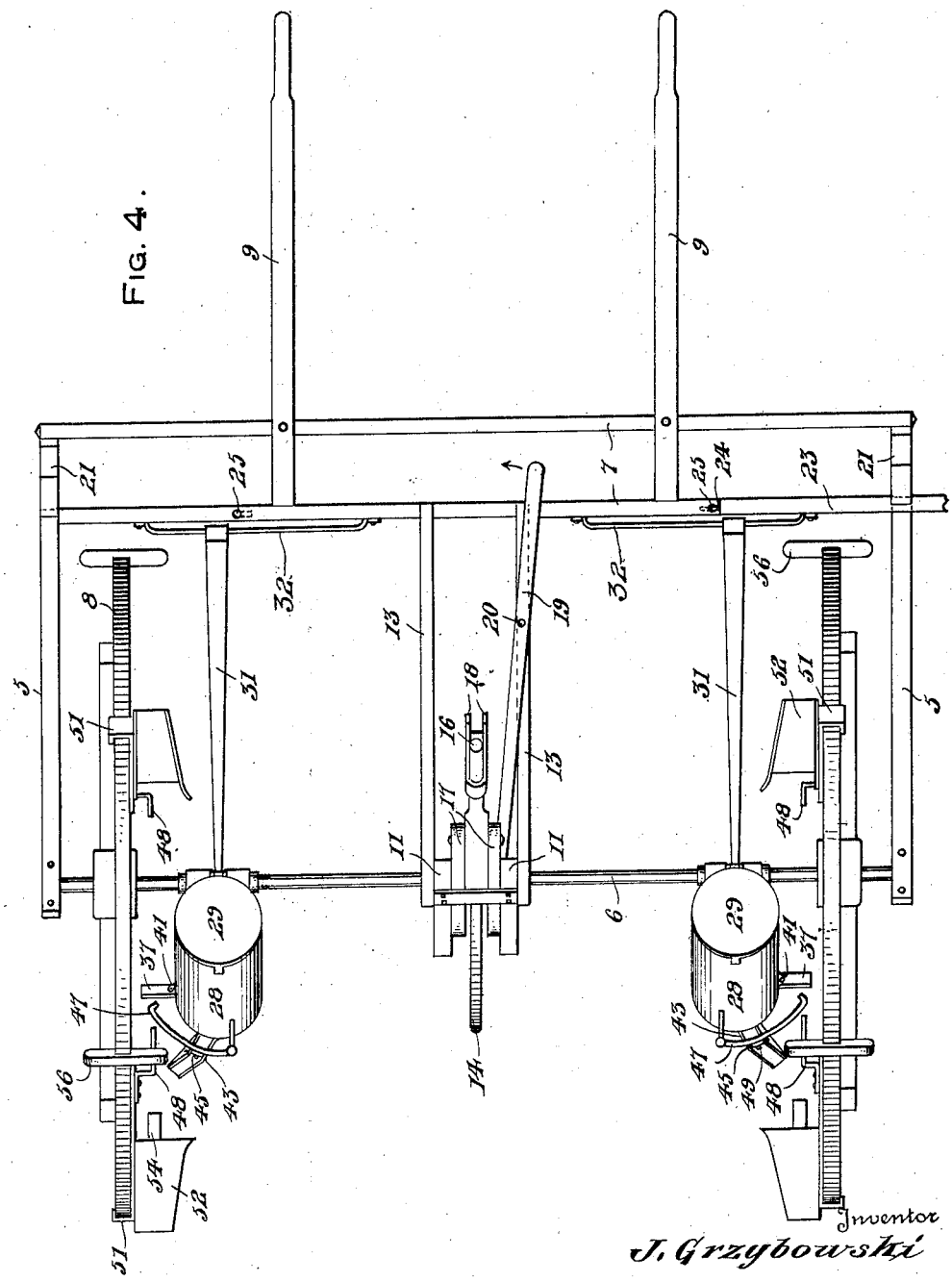

UNITED STATES PATENT OFFICE.

JOSEPH GRZYBOWSKI, OF HURON, SOUTH DAKOTA.

CORN OR BEAN PLANTER.

1,362,569. Specification of Letters Patent. Patented Dec. 14, 1920.

Application filed October 28, 1919. Serial No. 333,869.

*To all whom it may concern:*

Be it known that I, JOSEPH GRZYBOWSKI, a citizen of Poland, (having declared his intention to become a citizen of the U. S. of America,) residing at Huron, in the county of Beadle and State of South Dakota, have invented certain new and useful Improvements in Corn or Bean Planters, of which the following is a specification.

This invention relates to certain new and useful improvements in planters particularly designed for depositing, at suitable intervals, corn or beans in furrows previously formed in any usual or preferred manner.

The primary object of the present invention is to provide, in a planter of the present kind, novel means for intermittently delivering beans or corn successively to a number of pockets as the latter come in proper position for being subsequently opened to deposit the bean or corn in a furrow.

Other objects will become apparent from the following detailed description of the invention which consists in the novel combination, form, and arrangement of parts shown in the drawings, and claimed.

In the drawings,

Figure 1 is a side elevational view of a planter constructed in accordance with the present invention, Fig. 2 is a longitudinal sectional view thereof, Fig. 3 is an end view in elevation of the same, Fig. 4 is a top plan view of the device shown in Figs. 1 to 3 inclusive with the row-marking device broken away, Fig. 5 is a fragmentary detail view partially broken away to illustrate certain specific elements of construction relative to the bean or corn-depositing elements, Fig. 6 is a view similar to Fig. 5, with the elements further advanced in their cycle of operation, Fig. 7 is a view similar to Fig. 6, with the elements in a still further position of their cycle of operation, Fig. 8 is a horizontal sectional view of the bean or corn-holding hopper and delivering means carried thereby, Fig. 9 is a vertical sectional view, partly broken away, of the device shown in Fig. 8, Fig. 10 is a view similar to Fig. 7, illustrating the means for locking the bean or corn-delivering slide in an inoperative position.

Fig. 11 is a detached view of one of the bean or corn-receiving pockets illustrated in perspective, Fig. 12 is a fragmentary sectional view of one of the supporting wheels of the planter and illustrating the construction of the ground-engaging bars, and Fig. 13 is a top plan view of the device shown in Fig. 12.

Referring more in detail to the several views, the present invention embodies a supporting frame including side bars 5 which are connected at their forward ends by the shaft 6, and at their rear ends by spaced transverse bars 7. Upon the axle or shaft 6, a pair of supporting wheels 8 are journaled for free rotation inwardly of the side bars 5, while a pair of handles 9 extend rearwardly from and are rigidly secured to the transverse bars 7 to be grasped by the operator for moving the device forwardly in operation. In order to support the rear end of the frame from the ground when the device is not in use, suitable braced props 10 are provided.

Depening from and carried by the central portion of the axle 6 are a pair of standards 11 which extend to a point slightly above the ground and which are longitudinally slotted as at 12, adjacent their lower ends, said standards 11 being held against pivotal movement by any suitable means such as the bars 13, which are fastened to the upper ends of the standards and to the forward one of the transverse bars 7. A small wheel 14 is disposed between the standards 11 and is provided with an axle 15 having its opposite ends projecting into the slots 12 of the standards 11 whereby vertical movement of said wheel and axle is permitted. A suitable hand lever 16 is pivoted upon the axle 6 between the standards 11, and this lever has links 17 pivoted thereto, the other ends of the links 17 being pivoted on the axle 15 inwardly of the standards 11 whereby downward movement of the lever 16 from the full line position of Fig. 2 to the dotted line position of said figure, will cause downward movement of said links 17 and the wheel 14 so as to cause an engagement of the latter with the ground and raising of the wheels 8 off of the ground for the purpose of permitting the planter to be quickly wheeled off from the field or onto the same subsequent to or preparatory to planting. In order to lock the lever 16 in its dotted line position of Fig. 2, a catch 18 is pivoted to the free end portion of said lever and arranged to engage the forward transverse bar 7 as will be apparent. A bar 19 is pivoted as at 20 to one of the bars 13 to swing horizontally into and out of engagement with one of the links 17 for the purpose of maintaining the lever 16 raised or to permit lowering of the same as desired, the free forward end of said bar 19 being disposed so as to bear against the rearward face of said link 17 when holding the lever 16 raised as clearly shown in Figs. 2 and 4.

Secured upon the side bars 5 between the transverse bars 7 are cleats 21 provided with overhanging lips 22 as shown more clearly in Fig. 1, and beneath which may be disposed the horizontal rod 23, a pin 24 of angular formation being secured upon the inner end of said rod 23, for engagement in one of the undercut sockets 25 provided in the forward transverse bar 7. The rod 23 may be disposed to project beyond either side of the planter by positioning the pin 24 in the desired one of the sockets 25 and then moving the rod under the lip 22 of the adjacent cleat 21. The rod 23 has any suitable form of marking tool 26 secured upon the outer end thereof so as to score the earth for indicating the position of the next furrow as is usually practised in connection with devices of the present character.

A pair of frames 27 are hung from the axle 6 adjacent the supporting wheels 8, and said frames 27 have hoppers 28 rigidly secured thereto for the reception of a quantity of beans or corn according to which is desired to be planted, said hopper 28 being provided with a suitable hinged cover 29 which may be opened for the introduction of the corn or beans. The frames 27 are each provided with a socket member 30 which projects rearwardly and receives the forward end of a bar 31, the other end of said bar 31 being fastened in any suitable manner to the forward transverse bar 7 so as to hold the frames 27 and hoppers 28 at the inclination shown in Figs. 1 and 5. As shown, the rear ends of the bars 31 are slidably mounted upon rods 32 and the frames 27 are slidable upon the axles 6 so as to provide for adjustment of the hoppers 28 relative to each other so as to regulate the distance between the rows as desired. The frames 27 include a segmental actuating member 33 disposed lower than the bottom of the hopper 28 and concentric with the rims of the wheels 8 for a purpose which will presently become apparent. The hopper 28 has a bottom 34 above which is arranged a disk 35 mounted for rotation and provided with a series of spaced marginal apertures 36. A lever 37 is pivotally mounted upon the pivot 38 of the disk 35 and projects outwardly through a slot 39 provided in the hopper 38, said lever being yieldingly retained in its position of Fig. 8 by means of a spring 40 and having a pawl 41 adjacent its outer end which is spring-pressed into engagement with the notches 42 provided in the edge of the disk 35 adjacent the apertures 36 thereof. From the foregoing it will be readily apparent that upon movement of the lever 37 in the direction of the arrow in Fig. 8, the disk 35 will be rotated in a similar direction for depositing successively one bean at a time from each of the apertures 36 into the chute 43 which is rigidly carried by the hopper 28 beneath the opening 44 provided in the bottom 34 of the latter. As soon as the lever 37 is released the spring 40 returns the same to the position of Fig. 8, wherein the pawl 41 engages in the next succeeding notch 42.

A gate 45 is pivoted to each of the chutes 43 so as to retain the bean or corn in said chute, said gate 45 being normally closed by means of a spring 46. An actuator 47 is pivoted to the hopper 28 and extends toward the lever 37 to a position whereby the same may be swung by the trips 48 which are fastened at suitable intervals around the supporting wheels 8, said actuator 47 being fastened as at 49 to the upper end of the gate 45 so as to cause opening of the latter upon movements of the actuator 47.

In order to hold the lever 37 out of the path of the trips 48, a hook 50 is pivoted to the frame 27 and to a lever 51 so that when the lever 51 is in its full line position of Fig. 10, the lever 37 may be disposed behind the hooked end of said hook and there retained inoperatively disposed. By moving the lever 51 to its dotted line position of Fig. 10, the hook 50 is lowered and the lever 37 released.

Suitable bean or corn-receiving pockets 52 are secured by brackets 53 at intervals around the supporting wheels 8, and these brackets 51 carry the trips 48 as shown in Fig. 11. The pockets 52 are provided with hinged closures 53 which are normally retained closed by means of the spring 54 and which are opened by engagement of the lugs 55 with the segmental actuating members 33 for depositing the bean or corn in the furrow.

As resistance is offered to the rotation of the wheels 8 by engagement of the trips 48, with the actuators 47, and levers 37, and by engagement of the lugs 55 with the segmental actuating members 33, it has been found necessary to provide some means on the wheels 8 to insure sufficient traction and in order to provide the same, suitable transverse bars or cleats 56 are bolted or otherwise fastened to the rims of the wheels 8 as shown more clearly in Figs. 12 and 13. It is preferred to groove the cleats 56 as at 57 for reception of the rim of the supporting wheel 8, bolts 58 being passed through the cleats 56 and a clamping strap 59 for rigidly fastening the cleats 56 in position.

It is to be noted that when the hoppers 28 are adjusted toward and away from each other to plant in rows which are spaced different distances apart, lugs 55 and trips 48 will have to be varied in form in order to insure engagement thereof with the members 33 and actuator 47 and lever 37.

In operation, the operator grips the handles 9 and propels the planter forwardly whereby rotation is imparted to the supporting wheels 8 so as to cause engagement of one trip 48 with each actuator 47 for opening the adjacent gate 45 as shown in Fig. 6 whereby the bean or corn is dropped into the pocket 52 disposed beneath the chute 43. Upon further rotation of the wheels 8, the trips 48 engage levers 37 and thereby impart a partial rotation to the disk 35 whereby another bean or corn kernel is brought above the aperture 44 and deposited into the chute 43. Further movement causes disengagement of the trips 48 from the levers 37 so as to allow the latter to return to their normal position, whereupon the lugs 58 engage the segmental actuating members 33 and thereby cause the closures 53 to open and deposit the bean or corn kernel in the furrow. When the lugs 55 leave the actuator members 33, the closure members 55 automatically return to closed position. This operation is repeated in rapid succession with respect to each succeeding trip 48 and pocket 52.

From the foregoing description, it is believed that the construction and operation of the present invention will be readily understood by those skilled in the art.

While the form of the invention herein shown and described is what is believed to be the preferred embodiment thereof, it may be nevertheless understood that minor changes may be made in the form, combination and arrangement of parts herein, without departing from the spirit and scope of the invention as claimed.

What I claim as new and desire to secure by Letters Patent is:—

1. A planter of the class described comprising a frame having supporting wheels, a transverse axle upon which said supporting wheels are journaled, a pair of frames loosely mounted in spaced relation and slidable upon said axle, hoppers carried by said frames, means to deliver articles to be planted from said hoppers, and bars carried by the frame for supporting the hoppers in an inclined position, said bars being adjustable toward and from each other transversely of the frame.

2. A planter of the class described comprising a frame having supporting wheels, a transverse axle upon which said supporting wheels are journaled, a pair of frames loosely mounted in spaced relation and slidable upon said axle, hoppers carried by said frames, means to deliver articles to be planted from said hoppers, bars carried by the frame for supporting the hoppers in an inclined position, said bars being adjustable toward and from each other transversely of the frame, pockets carried by said supporting wheels, segmental actuating members associated with said hoppers, and closure members for said pockets actuated for opening by said segmental actuating members.

In testimony whereof I affix my signature.

JOSEPH GRZYBOWSKI.